United States Patent [19]

Weber et al.

[11] 3,757,194
[45] Sept. 4, 1973

[54] CORDLESS POWER TOOL HAVING REMOVABLE BATTERY PACK

[75] Inventors: Edwin J. Weber; Timothy G. Pugh, both of Baltimore, Md.

[73] Assignee: The Black and Decker Manufacturing Company, Towson, Md.

[22] Filed: July 3, 1972

[21] Appl. No.: 268,770

[52] U.S. Cl.............. 320/2, 15/DIG. 1, 30/228, 30/DIG. 1, 310/50, 320/27
[51] Int. Cl................................................ H02j 7/00
[58] Field of Search.................... 310/50, 47, 89; 320/2, 27; 30/228, 383, DIG. 1, 216; 15/DIG. 1; 136/173

[56] References Cited
UNITED STATES PATENTS

| 3,533,119 | 10/1970 | Dokos | 320/2 |
|---|---|---|---|
| 3,083,457 | 4/1963 | Ottosen | 30/216 |
| 3,144,890 | 8/1964 | Irgens | 30/383 |
| 3,606,216 | 9/1971 | Chambers | 320/2 |
| 3,067,373 | 12/1962 | Hopt | 320/2 |
| 3,196,299 | 7/1965 | Kott | 310/50 |
| 2,674,795 | 4/1954 | Long | 30/216 |
| 2,843,164 | 7/1958 | Marsh | 30/383 |

FOREIGN PATENTS OR APPLICATIONS

| 1,176,740 | 8/1964 | Germany | 320/2 |
|---|---|---|---|
| 1,119,384 | 12/1961 | Germany | 15/DIG. 1 |

*Primary Examiner*—R. Skudy
*Attorney*—Leonard Bloom, Joseph R. Slotnik and Edward D. Murphy

[57] ABSTRACT

A shrub and hedge trimmer including elongated relatively reciprocating toothed blades and a housing containing a D. C. motor for operating at least one of the blades, and incorporating a battery pack having exterior grooves slidably mounted on tracks in the body member for automatic snap-in connection to the motor. The battery pack is shaped to form, with the housing, a smooth, aesthetically pleasing appearance. In addition, the battery pack is readily removably from the housing for recharging and may be replaced by an A. C. – D. C. converter unit of the same size and shape for direct connection of the hedge trimmer to house current. Handles are provided on and attached to the housing for easy handling of the device.

18 Claims, 12 Drawing Figures

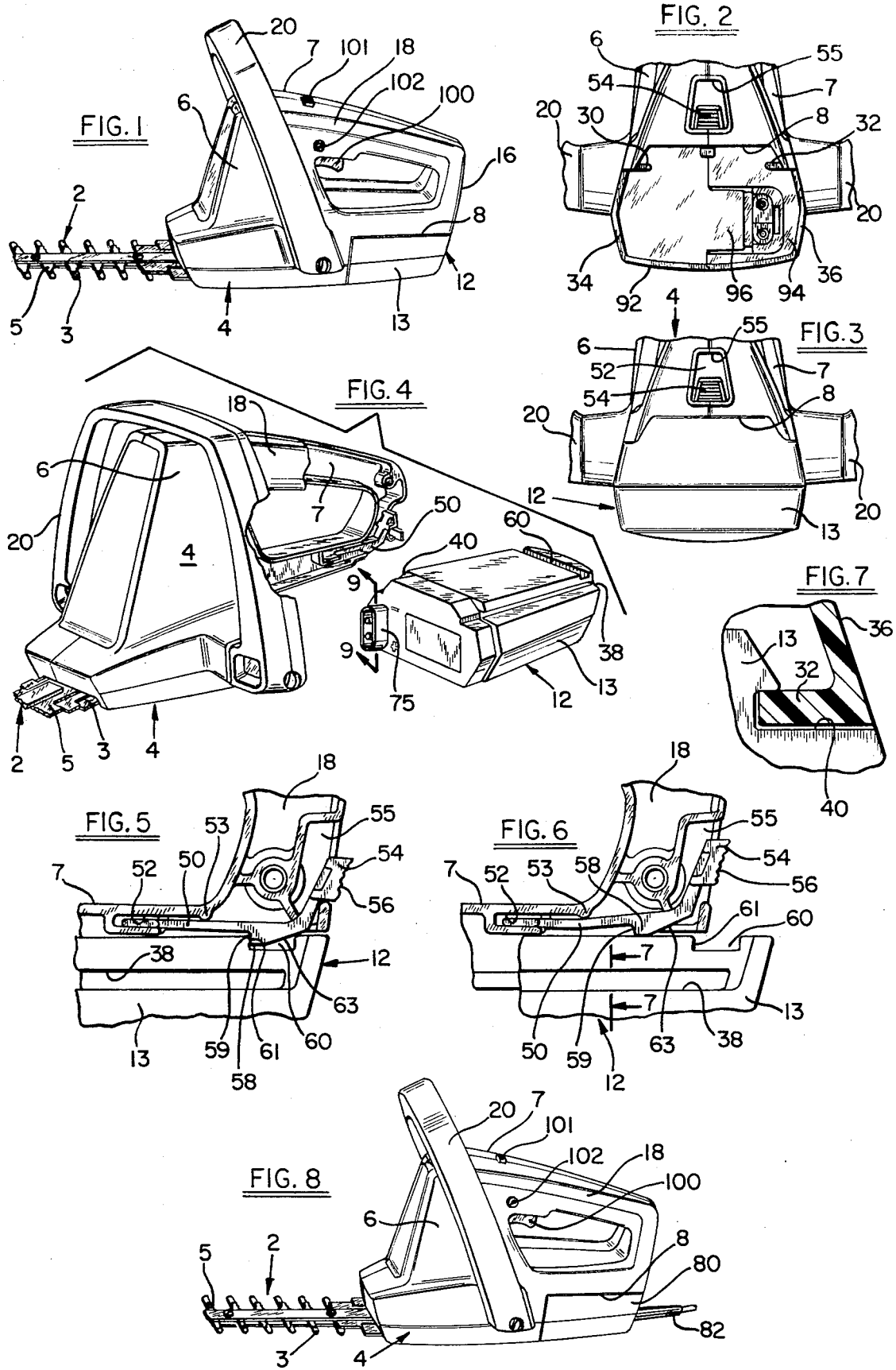

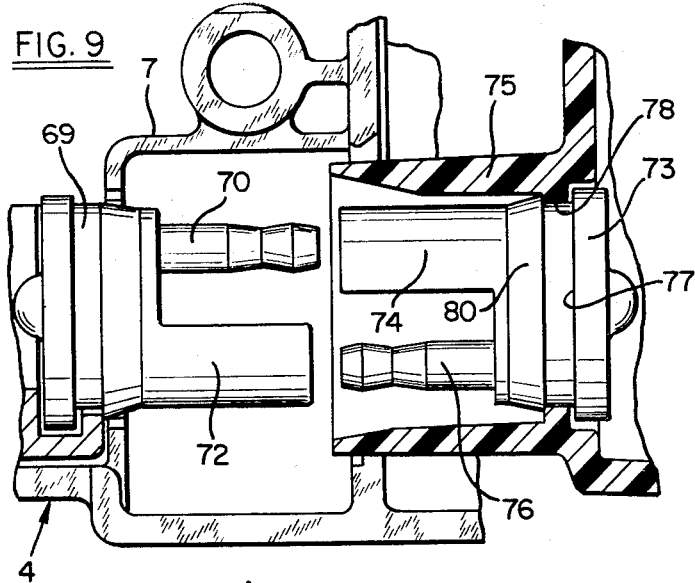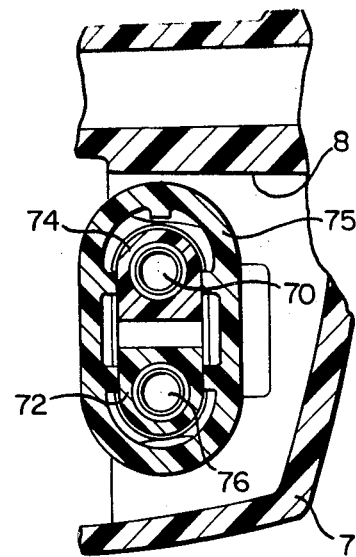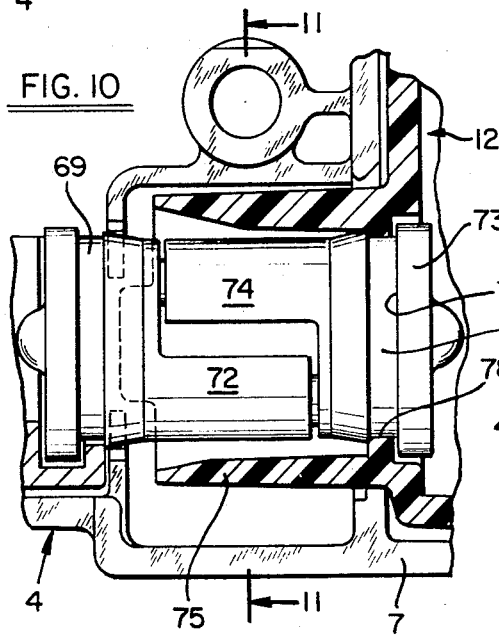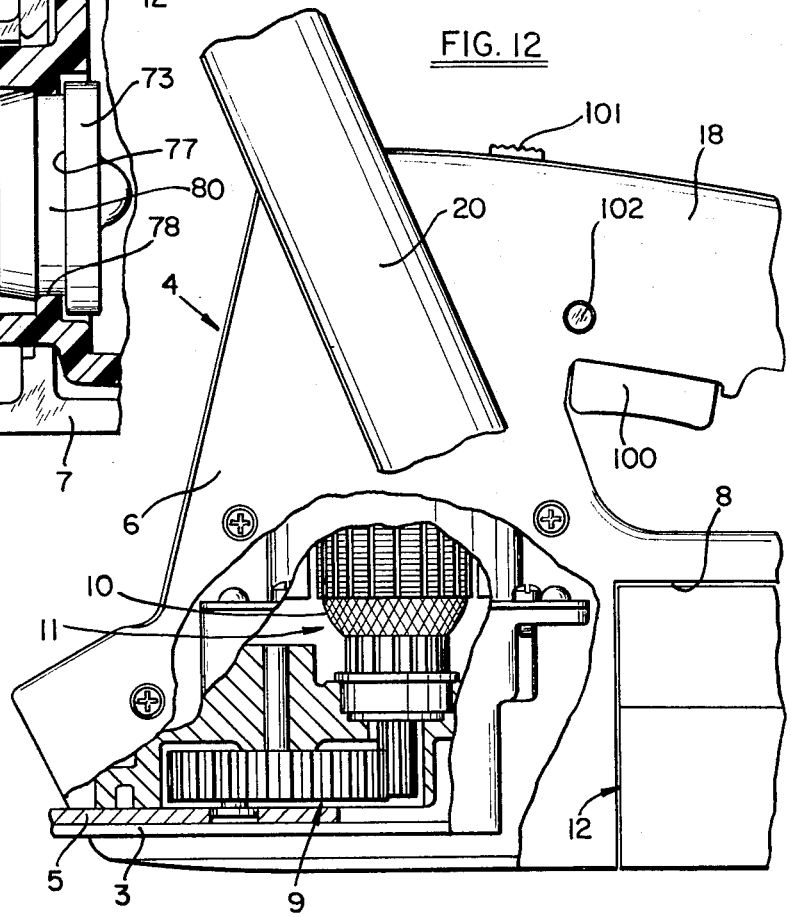

3,757,194

CORDLESS POWER TOOL HAVING REMOVABLE BATTERY PACK

BACKGROUND OF THE INVENTION

It is now well known to provide shrub and hedge trimming and similar tools in which the trimming operation is performed by elongated relatively reciprocating toothed blades which are operated by electric power means. These tools may be powered by conventional house current through a trailing cord, or by a battery means carried on the tool. In the latter version, the battery means generally is large and cumbersome, and largely detracts from the appearance of the tool and makes it difficult to handle. The present invention provides an improved hedge trimming tool having a housing and removable battery pack providing a compact and easily handled tool, as well as one which is neat and aesthetically pleasing in appearance.

Furthermore, it is desirable that the battery means in these tools be readily rechargeable and replaceable. Also, for maximum versatility these tools should be adapted to run on house current if desired. The present invention satisfies all these criteria.

SUMMARY OF THE INVENTION

The present invention has to do with power operated tools, generally used for shrub and hedge trimming, of the general type described above. It is a principal object of the invention to provide a cordless shrub and hedge trimmer, or the like, powered by a battery pack removably secured to a motor housing, wherein the housing and battery pack together form a compact, smooth, and neatly contoured unit, and wherein the hedge trimmer is sized and its weight distributed for easy handling in use.

Furthermore, the present invention has, as a principal object, a shrub and hedge trimmer of the above character wherein the battery pack is easily removed for recharging or replacement, and wherein the battery pack may be replaced by a similarly contoured A.C. - D.C. converter enabling the tool to be run on house current.

More specifically, the main objects of the invention are to provide a unitary shrub and hedge trimmer consisting of reciprocating blades and a housing provided with handles, the parts of which are so constructed and arranged that substantially perfect balance between the blades and the housing is achieved when the tool is operated by using the handles. In accordance with the invention, the body is provided with a removable battery pack which may be pushed into the body member on guide flanges or tracks and which when in place completes the outward contours of the housing, and which may be easily removed from and replaced in the body member and latched there by externally releasable means. A further object is to provide an A.C. - D.C. converter unit of the same configuration as the battery pack, which may be removably inserted in the housing in place of the battery pack for operating the device on house current. Both the battery pack and the converter unit are provided with electrical plugs which cooperate with plugs in the housing so that on insertion of the battery pack or converter unit into the housing, proper electrical connection is made to the operating motor in the housing.

Other objects and features of novelty of the invention will be made apparent by the following description of a preferred embodiment of the invention.

DESCRIPTION OF THE DRAWINGS

FIG. 1 is a perspective view of the shrub and hedge trimmer provided by the invention in fully assembled condition;

FIG. 2 is a rear elevational view with the battery pack removed;

FIG. 3 is a rear elevational view with the battery pack in place;

FIG. 4 is an exploded perspective view of the tool shown in FIG. 1;

FIG. 5 is an enlarged view of the means provided for latching the battery pack in place;

FIG. 6 is a view similar to FIG. 5 but showing the latch in a released position and the battery pack partly removed;

FIG. 7 is an enlarged sectional view taken on line 7—7 of FIG. 6;

FIG. 8 is a view similar to FIG. 1 and showing an A.C. - D.C. converter installed in place of the battery pack;

FIG. 9 is an enlarged view showing the plugs for connecting the battery pack to the operating motor, the parts being shown disconnected;

FIG. 10 is a view similar to FIG. 9 but shows the parts connected;

FIG. 11 is a sectional view taken on line 11—11 of FIG. 10; and

FIG. 12 is an enlarged elevational view, partly broken away, of a portion of the hedge trimmer and showing the motor and gear train.

DESCRIPTION OF THE INVENTION

The shrub and hedge trimming tool provided by the invention is disclosed in perspective in FIG. 1 of the drawings and comprises a blade assembly 2 and a housing 4. The blade assembly 2 comprises elongated toothed blades 3, 5, the first of which is usually fixed to the body member while the latter is mounted in face-to-face relation with the fixed blade and is connected at its inner end through suitable gearing 9 to the armature 10 of a direct current electric motor 11 mounted within the housing 4. The blades 3, 5 are provided along their length with teeth extending from opposite sides thereof to provide the required cutting operation on either side of the tool.

The housing 4 comprises clam shell halves 6, 7 which enclose the operating motor 11 and transmission 9 for the blades 3, 5. At its rear and lower end, the housing 4 is cut away or recessed as shown at 8 to provide a receptacle for receiving an electrical power unit, in this case, a battery pack 12. A plurality of rechargeable electric batteries within the battery pack 12 are connected to the operating electric motor in the housing 4 when the battery pack is positioned in the recess 8, as will be described. In addition, the outward configuration of the battery pack 12 defined by a casing 13, is such that when it is in operative position within the recess 8 of the housing 4, it completes the outward configuration of the housing 4 thereby forming a smooth and continuous exterior configuration, the bottom, side walls and end wall of the battery pack 12 continuing the configuration of the adjacent walls of the housing 4 as shown.

The housing 4 is shaped at its upper and rearward end to form an integral handle 18, and has a bail handle 20 suitably attached thereto adjacent the forward end thereof. The handles 18, 20 are so positioned, and the weight of the component parts, such as the blades 2, the motor 11 and transmission 9 and the battery pack 12 so distributed, so that when the tool is operated by grasping the handles 18, 20 the weight of the tool is balanced and no effort need be expended by the operator in balancing the tool as it is used. With his hands in position on the handles 18, 20, the user can actuate a switch trigger 100 (which controls on-off operation of the motor). Desirably, the trigger 100 is normally locked "off" and is released by pulling rearwardly on a latch 101. Also, if desired, a lock button 102 adapted to lock the trigger 100 "on" may be provided.

Means are provided by the invention for slidably receiving the battery pack 12, within the recess 8 in the housing 4. Thus, the housing members 6, 7 are provided with flanges 30, 32 which extend inwardly from side walls 34, 36, respectively, and into the recess 8. These flanges 30, 32 extend longitudinally, i. e., fore and aft, of the tool and define a pair of opposed tracks. The battery pack 12 is formed with guideways or grooves 38, 40 which slidably receive the flanges 30, 32. It will be seen that when the battery pack 12 is to be positioned in operative position within the housing 4, the flanges 30, 32 are positioned in the grooves 38, 40 and the battery pack 12 slidably moved along the flanges until it is completely within the recess 8 as shown in FIGS. 1 and 3. In this position, the side and end walls of the battery pack 12 form continuations of the adjacent walls of the housing 4.

Means are provided for releasably latching or locking the battery pack 12 within the housing recess 8, and such means are automatically operable upon full insertion of the battery pack 12 into the housing 4 in the manner described above, which is by movement of the battery pack grooves 38, 40 along the flanges 30, 32 of the housing 4. This means is particularly disclosed in FIGS. 5 and 6 of the drawings and comprise an elongated flexible latch 50 having its forward end positioned in a recess 52 in the housing 4. The latch 50 extends rearwardly below a projection 53 on the housing 4 and upwardly into a pocket 55 in the rear end of housing 4. The upper rear end of the latch 50 terminates in a head 54 positioned within the pocket 55 and provided with a serrated surface 56 for finger engagement. The resilient nature of the latch 50 together with its engagement with projection 53 normally holds the latch 50 in a position where a projection 58 on its lower surface is disposed in a recess 60 in the battery pack 12. The projection 58 and the recess 60 define abutting surfaces 59, 61, respectively, which hold the battery pack 12 in place, as shown in FIG. 5. When it is desired to remove the battery pack 12, the user pushes upwardly on the latch head 54 and lifts the surface 59 clear of the surface 61. During reassembly of the battery pack 12 to the housing 4, the battery pack engages a tapered surface 63 and lifts the latch 50 (see FIG. 6). When the battery pack 12 is fully inserted, the projection 58 snaps into the recess 60.

Means are provided by the invention for insuring a proper connection between the battery pack 12 and the operating motor when the battery pack 12 is in operative position in the housing 4. As shown in FIGS. 9-11, a plug body 69 is trapped in place on the housing 4 and is provided with male and female terminals 70, 72 electrically connected to the operating motor 11 and the switch controlled by trigger 100, and extending into the housing recess 8. The battery pack 12 includes a plug 73 having an external recess 77 receiving a flange on the casing 13 to trap the plug 74. In addition, the plug 73 is provided with complimentary female and male terminals 74, 76 disposed externally thereof and adapted to electrically engage with the terminals 70, 72 when the battery pack 12 is in place in the housing recess 8 (see FIG. 10). The plug 73 has a conical tapered flange 80 forward of the recess 77 to allow the plug 73 to be snapped into place in the casing 13 while preventing its withdrawal in use. An oval shaped shield 75 on the battery pack casing 13, surrounds and protects the terminals 74, 76 from, for example, being accidentally shorted.

It will be apparent that because of the structure and relation of the four plugs, 70, 72, 74, 76, proper connection between the battery pack 12 and the motor 11 will be insured when the battery pack 12 is in place on the housing 4. When the battery pack 12 is removed from the housing 4, such as, for example, for recharging, terminals 70, 72 are disconnected from terminals 74, 76, and the tool is thereby rendered inoperative. Thereafter, the battery pack 12 can be connected to a charger, through terminals 74, 76 mating with charger terminals similar to terminals 70, 72, and; when recharged, the battery pack 12 can be reassembled to the tool housing 4.

As described above, the electric motor 11 positioned in the housing 4 may be energized either by the self-contained battery pack 12 or, if desired to run the tool on house current, by an A.C. - D.C. converted unit 80, in FIG. 8, a suitable converter unit to which there is connected a trailing cord 82 for connection to house current is shown in position on the housing 4 in place of the battery pack 12. Desirably, the converter 80 has the same size and external configuration as the battery pack 12, and also has substantially the same weight, by reason of which the balance of the tool is maintained regardless of whether it is operated by the battery pack 12 or by the house current supplied through cord 82 and converter unit 80.

By the foregoing, there has been disclosed an improved power operated tool calculated to fulfill the inventive objects set forth hereinabove, and while a preferred embodiment has been illustrated and described in detail, various additions, substitutions, modifications and omissions may be made thereto without departing from the spirit of the invention.

We claim:

1. A power operated shrub or hedge trimmer comprising a housing having an electric motor disposed in the forward end thereof, a blade assembly extending forwardly from the lower end of said housing and driven by said motor through a transmission below said motor, said housing having a lower, rearward part cut away to form an outwardly opening recess, an electric power unit constructed to slidably fit within said recess and having such an external configuration that when it is fully within the recess its external walls form continuations of the external walls of said housing adjacent said recess, cooperating electrical connector means on said power unit and said housing for electrically powering said motor when said power unit is fully in place within said housing, a transverse recess in the upper rearward part of said housing, forming above it a first handle extending longitudinally of said housing, to be grasped by one hand of a user, and a second handle positioned forwardly of said recess and being inverted U-shaped in configuration whereby its cross piece is above said housing to be grasped by the other hand of said user, said motor, said transmission, and said power unit being disposed for good balance of said tool when handled by said user.

2. A power operated tool according to claim 1, comprising in addition a finger-operated switch trigger extending from said first handle downwardly into said transverse recess.

3. A power operated tool according to claim 1, in which said power unit contains batteries.

4. A power operated tool according to claim 1, in which the power unit contains an A.C. - D.C. converter and has a trailing cord for connection to house current.

5. A power operated shrub or hedge trimmer comprising a blade assembly and a housing, an electric motor within said housing and operatively connected to the blade assembly, said housing having a part thereof cut away to form an outwardly opening recess, a battery pack constructed to slidably fit within said recess and having such an external configuration that when it is fully within the recess its external walls form continuations of the external walls of said housing adjacent said recess, and cooperating plugs on said battery pack and said housing for powering said electric motor when said battery pack is fully in place within said housing.

6. A power operated tool according to claim 5, in which said plugs on said battery pack are male and female, and said cooperating plugs on said housing are, respectively, female and male.

7. A power operated shrub or hedge trimmer comprising a housing having an electric motor disposed therein, a blade assembly extending forwardly from said housing and driven by said motor, said housing having a part thereof cut away to form an outwardly opening recess, a battery pack constructed to slidably fit within said recess and having such an external configuration that when it is fully within the recess its external walls form continuations of the external walls of said housing adjacent said recess, cooperable electrical connector means on said battery pack and said housing connecting said battery pack and motor when said battery pack is fully within said recess, and a latch carried by said housing and normally biased toward a position whereby to automatically secure said battery pack to said housing upon complete insertion of said battery pack into said recess, said latch being manually releasable whereby said battery pack can be removed from said housing.

8. A power operated tool according to claim 7, in which the housing has an exterior access opening, said latch having a part within said opening for finger engagement to release said latch from said battery pack.

9. A power operated tool as defined in claim 7 wherein said latch includes an elongated resilient member carried within said housing and having a manually engageable portion disposed exteriorly of said housing, said latch member having detent means cooperable with detent means on said battery pack, whereby to allow assembly of said battery pack to said housing without manual operation of said detent means, said detent means automatically engaging when said battery pack is slidably inserted fully into said recess, whereby said battery pack can only be removed by positive manual actuation of said latch member.

10. A power operated tool as defined in claim 7 wherein said connector means on said battery pack extends outwardly thereof, and a shield surrounding and protecting said battery pack connector means.

11. A power operated shrub or hedge trimmer comprising a housing having an electric motor therein, a blade assembly extending forwardly from said housing and driven by said motor, said housing including clam shell members enclosing said motor and cut away at their rear end to form an outwardly opening recess, a power pack constructed to fit within said recess, said housing members and said battery pack having pairs of longitudinally extending, complementary flanges and guide ways slidably supporting said battery pack in said housing recess, a latch carried by one of said housing and battery pack and operable to secure said battery pack to said housing upon complete insertion of said battery pack into said recess, said latch being manually releasable whereby said battery pack can be removed from said housing, and means on said housing electrically connectable with means on said housing battery pack when said battery pack is fully assembled to said housing, whereby to electrically connect said battery pack to said motor.

12. A power operated tool according to claim 11, in which said housing is formed by two matching complementary halves joined along a longitudinal face of said housing.

13. A power operated tool as defined in claim 11 wherein said housing members are formed with opposed flange tracks, said battery pack being formed with guideways slidably receiving said tracks.

14. A power operated device comprising a housing having an electric motor disposed therein, output means powered by said motor, said housing having a part thereof cut away to form an outwardly opening recess, a battery pack constructed to slidably fit within said recess and having such an external configuration that when it is fully within the recess its external walls form continuations of the external walls of said housing adjacent said recess, cooperable electrical connector means on said battery pack in said housing connecting said battery pack and motor when said battery pack is fully within said recess, and a latch carried by one of said housing and battery pack and operable to secure said battery pack to said housing upon complete insertion of said battery pack into said recess, said latch being manually releasable whereby said battery pack can be removed from said housing.

15. A power operated device comprising a housing having an electric motor disposed therein and powering output means, said housing having a handle, switch means adjacent said handle and electrically connected with said motor, said housing having a part thereof cut away to form an outwardly opening recess, a battery pack constructed to slidably fit within said recess and having such an external configuration that when it is fully within the recess its external walls form continuations of the external walls of said housing adjacent said recess, and cooperating means on said battery pack and said housing for powering said electric motor when said battery pack is fully in place within said housing.

16. A power operated device comprising a housing having an electric motor disposed therein, output means on said housing connected to said motor to be driven thereby, said housing including handle means, switch control means adjacent said handle means and operably connected to said motor for controlling the same, said housing having an outwardly opening recess therein, means defining slidable guide ways on said housing adjacent said recess and cooperatively, slidably receiving generally complementary slidable guide way means on a battery pack, said battery pack being constructed to slidably fit, by means of said slidable guide way means, within said recess and having an external configuration such that when said battery pack is fully within said recess, its external walls form a smooth continuation of the external walls of said housing adjacent said recess, cooperating electrical connection means on said battery pack and said housing for powering said electric motor when said battery pack is fully in place within said housing, and releasable latch means retaining said battery pack within said recess.

17. A power operated shrub or hedge trimmer comprising a housing having an electric motor disposed in the forward end thereof and provided with handle means, a blade assembly extending forwardly from the lower end of said housing and driven by said motor through a transmission below motor, said housing having an outwardly opening recess at its lower, rearward portion, a battery pack constructed to slidably fit within said recess and having such an external configuration that when it is fully within the recess its external walls form a smooth continuation of the external walls of said housing adjacent said recess, latch means releasably retaining said battery pack within said recess, cooperating electrical connector means on said power unit and said housing for electrically powering said motor when said power unit is fully in place within said housing, said motor, said transmission, and said power unit being disposed for good balance of said tool when handled by said user.

18. A power operated, hand-held shrub or hedge trimmer comprising a housing having an electric motor therein, a blade assembly extending forwardly from the lower end of said housing and driven by said motor, handle means on the upper portion of said housing, said housing including clam shell members enclosing said motor and open at their lower rear end to form an outwardly opening recess, the battery pack constructed to fit within said recess and cooperable with said motor and blade assembly to balance said trimmer about said handle means, said housing members and said battery pack having pairs of longitudinally extending, complementary flanges and guide ways slidably supporting said battery pack in said housing recess, latch means carried by one of said housing and battery pack and cooperable with the other to secure said battery pack to said housing upon complete insertion of said battery pack into said recess, said latch being manually releasable whereby said battery pack can be removed from said housing, and means on said housing electrically connectable with means on said battery pack and when said battery pack is fully assembled to said housing, whereby to electrically connect said battery pack to said motor.

* * * * *

UNITED STATES PATENT OFFICE
CERTIFICATE OF CORRECTION

Patent No. 3,757,194          Dated September 4, 1973

Inventor(s) Edwin J. Weber; Timothy G. Pugh

It is certified that error appears in the above-identified patent and that said Letters Patent are hereby corrected as shown below:

Title Page, Under [56] References Cited, the following references were omitted:

| | | |
|---|---|---|
| 3,186,878 | 6/1965 | Filander |
| 3,212,188 | 10/1965 | Riley, Jr., et al |
| 1,403,623 | 1/1922 | Payne |
| 1,427,097 | 8/1922 | Feederle |
| 1,520,298 | 12/1924 | Mann |
| 2,468,784 | 5/1949 | Seagraves |
| 1,187,888 | 6/1916 | Diehm |
| 1,052,316 | 2/1913 | Cihucki |
| 804,984 | 11/1905 | Searle |
| 694,157 | 2/1902 | Johnson |
| 3,281,636 | 10/1966 | Fleckenstein, et al |
| 3,043,996 | 7/1962 | Hartwig, et al |
| 3,079,510 | 2/1963 | Hartwig |
| 3,550,280 | 12/1970 | Palm |

Column 6, line 13, the word "power" should be - - battery - -;

column 6, line 23, the word "housing" should be deleted;

column 6, line 44, the word "in" should be - - and - -.

Signed and sealed this 2nd day of April 1974.

(SEAL)
Attest:

EDWARD M. FLETCHER, JR.
Attesting Officer

C. MARSHALL DANN
Commissioner of Patents